US008007601B2

(12) United States Patent
López et al.

(10) Patent No.: US 8,007,601 B2
(45) Date of Patent: Aug. 30, 2011

(54) METHODS OF PRODUCING HIGH-STRENGTH METAL TUBULAR BARS POSSESSING IMPROVED COLD FORMABILITY

(75) Inventors: Edgardo Oscar López, Veracruz (MX); Lorenzo Vito Caserta, Dalmine BG (IT); Hernán Juan Desimone, Dalmine BG (IT); Cuauhtémoc Martinez Salazar, Veracruz (MX)

(73) Assignee: Tenaris Connections Limited, Kingstown (VC)

( * ) Notice: Subject to any disclaimer, the term of this patent is extended or adjusted under 35 U.S.C. 154(b) by 0 days.

(21) Appl. No.: 12/825,231

(22) Filed: Jun. 28, 2010

(65) Prior Publication Data

US 2010/0327550 A1    Dec. 30, 2010

Related U.S. Application Data

(62) Division of application No. 11/375,660, filed on Mar. 14, 2006, now Pat. No. 7,744,708.

(51) Int. Cl.
*B60G 21/055* (2006.01)
*C22C 38/00* (2006.01)

(52) U.S. Cl. .................. 148/320; 280/124.106; 267/188

(58) Field of Classification Search .................. 29/897.2; 148/320, 333–336, 519, 520, 570, 575; 267/183, 267/188, 273; 280/124.106, 684
See application file for complete search history.

(56) References Cited

U.S. PATENT DOCUMENTS

| 4,231,555 | A |  | 11/1980 | Saito |  |
|---|---|---|---|---|---|
| 4,336,081 | A |  | 6/1982 | Hijikata et al. |  |
| 4,376,528 | A |  | 3/1983 | Ohshimatani et al. |  |
| 4,526,628 | A | * | 7/1985 | Ohno et al. | 148/520 |
| 5,538,566 | A |  | 7/1996 | Gallagher |  |
| 5,598,735 | A |  | 2/1997 | Saito et al. |  |
| 6,196,530 | B1 |  | 3/2001 | Muhr et al. |  |
| 6,311,965 | B1 |  | 11/2001 | Muhr et al. |  |
| 6,384,388 | B1 |  | 5/2002 | Anderson et al. |  |
| 6,682,610 | B1 |  | 1/2004 | Inoue |  |
| 7,744,708 | B2 |  | 9/2007 | Lopez et al. |  |
| 7,862,667 | B2 |  | 1/2009 | Turconi et al. |  |

(Continued)

FOREIGN PATENT DOCUMENTS

EP    0 092 815    11/1983

(Continued)

OTHER PUBLICATIONS

U.S. Appl. No. 11/375,660, filed Mar. 14, 2006 (published as 2007/0216126 A1) and its ongoing prosecution history, including without limitation Office Actions, Amendments, Remarks, and any other potentially relevant documents.

(Continued)

*Primary Examiner* — George Wyszomierski
*Assistant Examiner* — Mark L Shevin
(74) *Attorney, Agent, or Firm* — Knobbe Martens Olson & Bear, LLP

(57) ABSTRACT

A method for producing a tubular bar, more particularly a stabilizer bar, is provided. The method comprises providing a tubular bar of desired size having an outer and inner surface, heating the bar to an elevated temperature, quenching the bar by application of a cooling fluid to the surfaces of the bar, and forming the tube to a desired shape without annealing. The method further provides for the composition of a high-strength, high formability carbon steel alloy to be used in conjunction with the method. Advantageously, the bar is formable without thermal processing subsequent to quenching. In this fashion, metal tubular bars, such as stabilizer bars, may be formed at reduced cost.

13 Claims, 8 Drawing Sheets

U.S. PATENT DOCUMENTS

| | | | |
|---|---|---|---|
| 2004/0131876 | A1 | 7/2004 | Ohgami et al. |
| 2004/0139780 | A1* | 7/2004 | Cai et al. ............... 72/377 |
| 2005/0087269 | A1 | 4/2005 | Merwin |
| 2006/0243355 | A1* | 11/2006 | Haiderer et al. ........ 148/593 |
| 2008/0314481 | A1 | 12/2008 | Garcia et al. |
| 2010/0068549 | A1 | 3/2010 | Agazzi et al. |
| 2010/0294401 | A1 | 11/2010 | Gomez et al. |
| 2010/0319814 | A1 | 12/2010 | Perez et al. |

FOREIGN PATENT DOCUMENTS

| | | | |
|---|---|---|---|
| EP | 0 753 595 | | 1/1997 |
| EP | 753595 | * | 1/1997 |
| EP | 1 717 324 | | 11/2006 |
| JP | 06-093339 | * | 4/1994 |
| JP | 2001-164338 | * | 6/2001 |
| JP | 2004-011009 | * | 1/2004 |

OTHER PUBLICATIONS

U.S. Appl. No. 12/042,145, filed Mar. 4, 2008 (published as 2009/0010794 A1)and its ongoing prosecution history, including without limitation Office Actions, Amendments, Remarks, and any other potentially relevant documents.

U.S. Appl. No. 11/997,900, filed Jun. 18, 2008 (published as 2008/0314481 A1) and its ongoing prosecution history, including without limitation Office Actions, Amendments, Remarks, and any other potentially relevant documents.

U.S. Appl. No. 12/306,917, filed Nov. 2, 2009 (published as 2010/0068549 A1) and its ongoing prosecution history, including without limitation Office Actions, Amendments, Remarks, and any other potentially relevant documents.

U.S. Appl. No. 12/743,801, filed Aug. 9, 2010 (published as 2010/0294401 A1) and its ongoing prosecution history, including without limitation Office Actions, Amendments, Remarks, and any other potentially relevant documents.

Beretta, Stefano et al., "Fatigue Assessment of Tubular Automotive Components in Presence of Inhomogeneities", Proceedings of IMECE2004, ASME International Mechanical Engineering Congress, Nov. 13-19, 2004, pp. 1-8.

Prevéy, Paul, et al., "Introduction of Residual Stresses to Enhance Fatigue Performance in the Initial Design", Proceedings of Turbo Expo 2004, Jun. 14-17, 2004, pp. 1-9.

U.S. Appl. No. 12/486,610, filed Jun. 17, 2009 and its ongoing prosecution history, including without limitation Office Actions, Amendments, Remarks, and any other potentially relevant documents.

U.S. Appl. No. 12/979,058, filed Dec. 27, 2010 and its ongoing prosecution history, including without limitation Office Actions, Amendments, Remarks, and any other potentially relevant documents.

Wegst, C. W., "Stahlschlüsell", Auflage 1989, Seite 119, Published 1989.

Mechanical Tubing and Cold Finishing, Metals Handbook Desk Edition, (2000), 5 pages.

International Search Report and Written Opinion for PCT/IB2007/001995 (corresponding to U.S. Appl. No. 11/375,660) dated Dec. 21, 2007.

International Preliminary Report on Patentability for PCT/IB2007/001995 (corresponding to PCT Application to U.S. Appl. No. 11/375,660) dated Jul. 17, 2008.

Corrected International Preliminary Report on Patentability for PCT/IB2007/001995 (corresponding to PCT Application to U.S. Appl. No. 11/375,660) dated Sep. 10, 2008.

English Translation of JP 2001-164338 to Sato et al., published Jun. 2001, 31 pages.

* cited by examiner

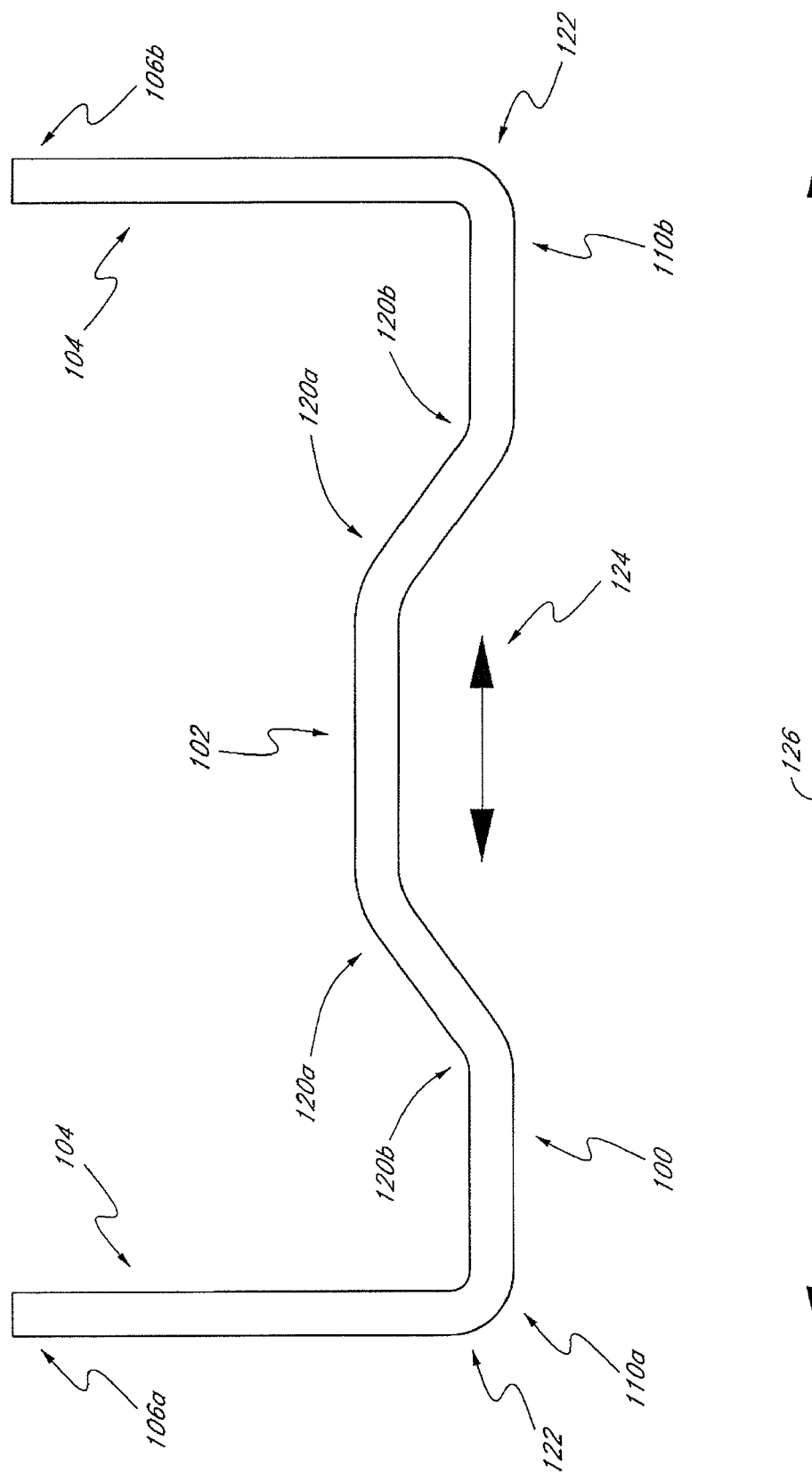

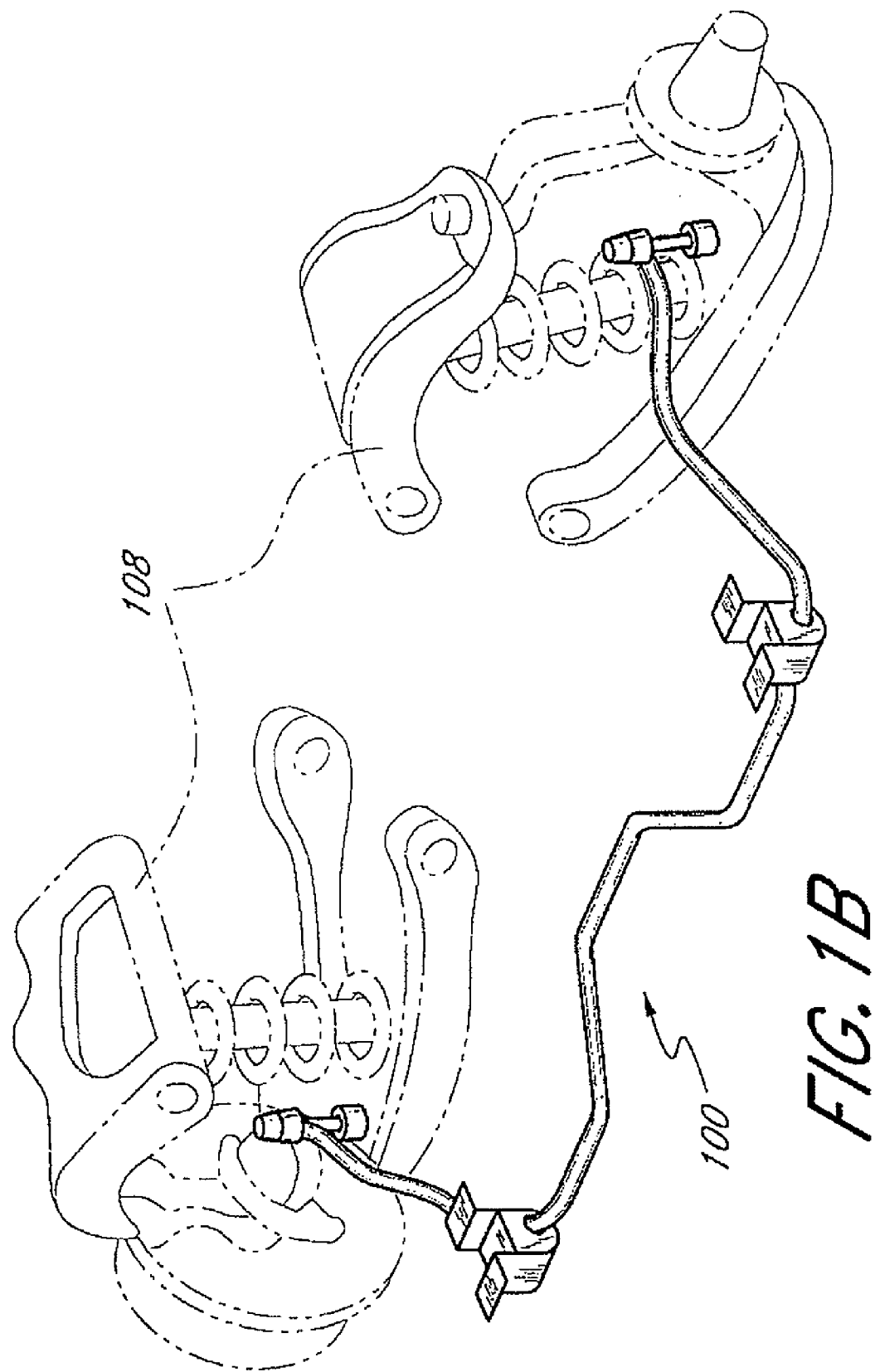

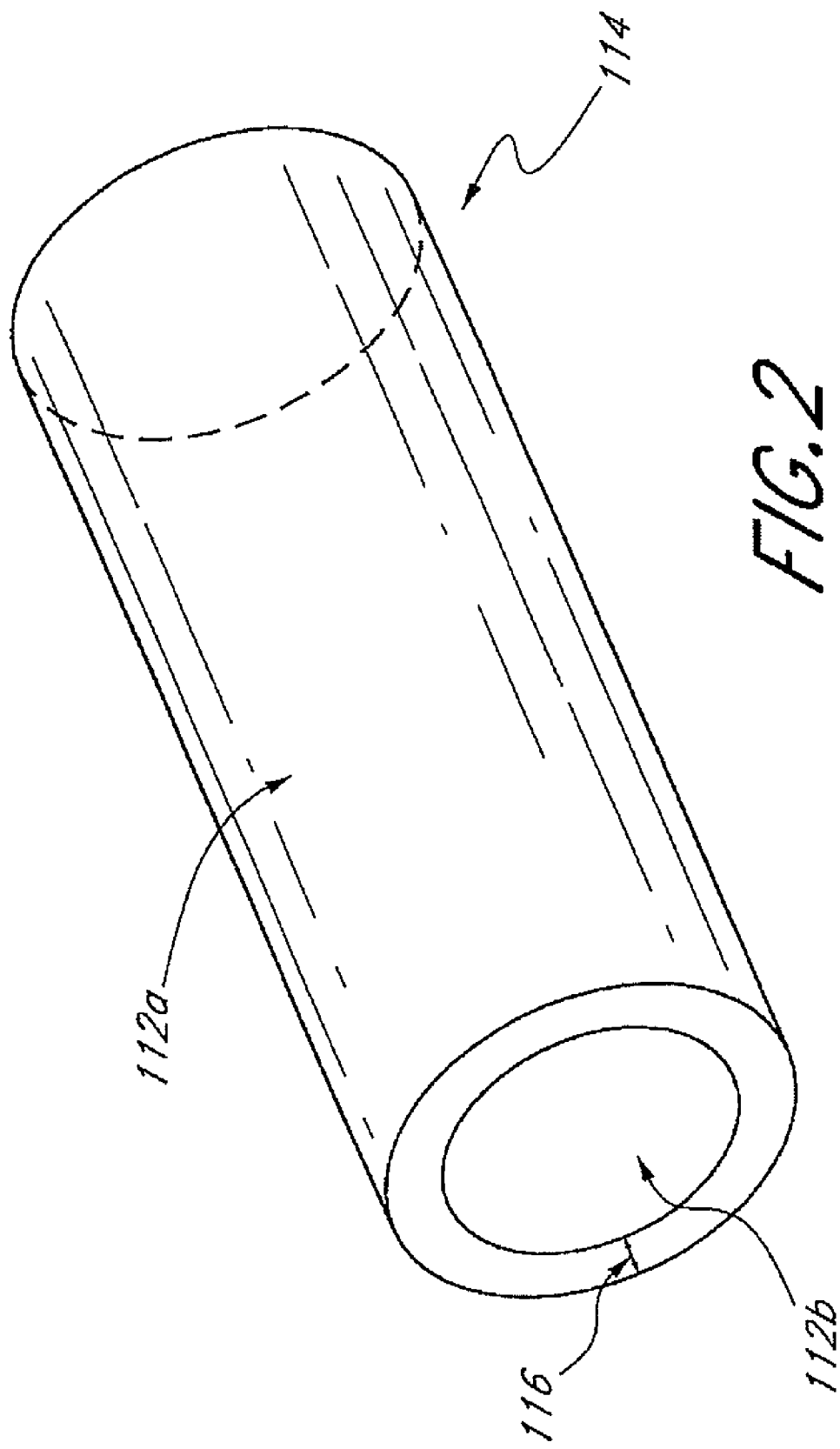

METHODS OF PRODUCING HIGH-STRENGTH METAL TUBULAR BARS POSSESSING IMPROVED COLD FORMABILITY

RELATED APPLICATIONS

This application is a divisional application of U.S. patent application Ser. No. 11/375,660, filed Mar. 14, 2006, entitled METHODS OF PRODUCING HIGH-STRENGTH METAL TUBULAR BARS POSSESSING IMPROVED COLD FORMABILITY, now U.S. Pat. No. 7,744,708, which is hereby incorporated in its entirety herein.

BACKGROUND OF THE INVENTION

1. Field of the Invention

The present invention relates generally to metal production and, in certain embodiments, relates to methods of producing metallic tubular bars having high strength and improved formability, and metal bars, particularly vehicular stabilizer bars, made by the same.

2. Description of the Related Art

Metal tubular bars possess a number of advantages over solid bars when incorporated into engineered structures. For example, tubular bars are lighter than corresponding solid bars, of benefit to applications in which weight is a primary consideration. Automobile stabilizer bars are one example of the use of metal tubular bars. These bars are attached to an auto frame between the tires and function to counteract roll which occurs during turning, ensuring more even wear on tires and greater steering control when turning. Unfortunately, owing to their reduced load-bearing cross-section, considering materials with identical mechanical properties, metal tubular bars also fail at lower loads than solid tubular bars of equal diameter The fabrication of metal tubular bar components has focused on maintaining their static strength and fatigue resistance while improving formability, the ability to shape a part to a desired configuration without damage. There are two general methods which have been developed to form and strengthen metal tubular bars, particularly steel tubular bars. In the first method, a tubular bar is hot or cold bent and then heat treated to strengthen the bar. In one implementation of this method, the tubular bar is initially hot or cold formed to shape when the metal is relatively soft, allowing the metal to be easily manipulated. Subsequently, the formed bar is heated and quenched to increase the strength of the steel. Following the quench, the hardened bar is mildly tempered to soften the steel while improving the toughness of the bar. Finally, the exterior surface of the tubular bar may be shot-peened to introduce a state of compressive stresses onto the surface which inhibits the growth of flaws under fatigue loadings which can lead to failure.

Often, though, the thermal stresses generated in the tubular bar during the quench distort the shape of the tubular bar, requiring time consuming and costly re-forming operations to return the tubular bar to its desired shape.

In the second method of fabricating metal tubular bar components, the tubular bar is formed after a strengthening operation. One embodiment of this method utilizes cold drawing to strengthen the tube, while another embodiment utilizes a heat treated tube for this purpose. Following the heat treatment, the tubular bar is bent to shape and then tempered to age-harden the metal. Lastly, shot-peening may be performed on the external and, in some cases, internal surfaces of the tubular bar.

The above methods require considerable time and effort to produce a high strength tubular bar with the desired properties. Accordingly, what is needed are bars and methods of manufacture offering improvements over these prior methods.

SUMMARY OF THE INVENTION

One embodiment of the present invention overcomes at least some of the problems of previous methods by providing an ultra high-strength bar, such as a tube preferably made of steel, suitable for cold forming or bending, and methods for making the bar. Such a bar or tube, after it has been formed or bent into the desired shape, maintains mechanical properties such as strength and/or fatigue life and can be used in its desired application without further thermal processing. In one embodiment, a bar is manufactured to exhibit no or minimal cracking upon visual inspection after being formed or bent.

In one embodiment, the bar comprises an elongate, hollow body which extends between a first end and a second end, defining an outer surface and an inner surface. In one embodiment, the elongate bar has a length and diameter suitable for shaping into a stabilizer bar which can be accommodated within the undercarriage of a vehicle. The bar further possesses an ultimate tensile strength of about 1400 MPa or greater, a yield strength to tensile strength ratio of between 0.65 and 0.90, and an elongation at failure of about 12% or greater.

One preferred embodiment of a metallic bar suitable for cold forming comprises a carbon steel alloy having a composition of about 0.13-0.35% carbon, about 0.8-2.0% manganese, about 0.1-0.7% silicon, about 0.01-0.07% aluminum, about 0-0.5% chromium, about 0-0.25% molybdenum, and about 0-0.3% vanadium. The bar may further comprise a plurality of bends, adapted to accommodate the stabilizer bar within the undercarriage of a vehicle.

In another embodiment, a method for producing tubular bars is provided. A first step of the method provides for fabricating a bar of desired size, where the bar has an outer and an inner surface. In one embodiment, the bar comprises the steel alloy described above. In a particular embodiment, the bar is tubular.

In a second step, the bar is subjected to one or more cold drawing operations. These drawing operations reduce the cross-section of the bar to predetermined final dimensions, including outer diameter and wall thickness, and are performed without heating the tube above room temperature. In additional benefit, the drawing operations also improve the surface quality of the bar, which serves to increases the fatigue resistance of the final part formed from the bar.

One embodiment of the method further comprises a third step wherein the bar is heated and quenched. During the heating operation of one embodiment, the bar may be heated at a rate of about 180 to 550° C./sec to a predetermined temperature preferably not less than about 900° C. In one embodiment of the method, the bar is heated by induction. It has been found that a high surface quality may be obtained if an induction furnace is utilized for heating the bar prior to quenching, enhancing the fatigue resistance of the bar. This benefit is due to the nature of the induction process, which involves very short transit times, precluding oxidation from taking place.

Following the heating process, the bar is subsequently quenched. In one preferred embodiment, the bar is cooled to room temperature at a rate of about 180 to 600° C./sec. In a preferred embodiment, the bar is cooled in this manner using water which is directed radially towards the bar. In one embodiment, a bar so quenched possesses sufficient formability to be shaped at a temperature less than about 80° C. following the quench. In another aspect, the bar possesses very high static and fatigue strength to function as an automobile stabilizer bar.

One embodiment of the method comprises a fourth step in which the as-quenched bar is formed after quenching to achieve the desired shape. The bar is cold formed from the as-quenched condition, without additional thermal processing such as tempering or annealing. This forming operation may comprise a plurality of bending operations performed at a temperature less than about 80° C. In another embodiment, the as-quenched bar is formed into a stabilizer bar comprising a central body and stabilizer arms, including a plurality of bends shaped to accommodate the stabilizer bar within the undercarriage of a vehicle.

In a fifth step provided by one embodiment of the method, the formed bar is given a surface treatment in order to induce a state of compressive residual stress on the surface of the bar which elevates the fatigue resistance of the formed bar. In one embodiment, the surface treatment comprises shot-peening. In alternative embodiments, the surface treatment may comprise autofrettage.

In one embodiment of the invention, a method for producing a tubular bar is provided. A bar is provided of desired size, is heated to an elevated temperature, such as above about 900° C., and is quenched. The bar as-quenched has an ultimate tensile strength of about 1400 MPa or greater, a yield strength to ultimate tensile strength ratio of between about 0.65 and 0.90 and an elongation of about 12% or greater. The bar is formed into a desired shape, for example, by bending. In one embodiment, the bar exhibits none, or substantially no cracking, upon visual inspection.

In another embodiment of the invention, a method for producing a tubular bar is provided. A bar is provided of desired size, is heated to an elevated temperature, and is quenched. The bar is bent into a desired shape. The bar as bent has a fatigue life of greater than about 300,000 cycles as measured under laboratory testing when the region about at least one of the bends is subjected to cyclic stresses above about 450 MPa, said fatigue life being measured without subjecting the bar to any subsequent thermal processing following bending of the bar.

In another embodiment, a tubular bar is provided comprising an elongate hollow body extending between a first end and a second end defining an outer surface and an inner surface. The elongate hollow body comprises a steel alloy comprising about 0.13 to 0.35% carbon, about 0.8 to 2.0% manganese, about 0.10% to 0.70% silicon, about 0.01% to 0.07% aluminum, up to about 0.50% chromium, up to about 0.25% molybdenum, and up to about 0.30% vanadium.

In another embodiment, a tubular bar suitable for cold forming is provided, comprising an elongate hollow body extending between a first end and a second end defining an outer surface and an inner surface. The elongate hollow body comprises a steel alloy having an ultimate tensile strength of about 1400 MPa or greater, a yield strength to ultimate tensile strength ratio of between about 0.65 and 0.90 and an elongation of about 12% or greater.

In another embodiment, a vehicular stabilizer bar is provided comprising an elongate hollow body extending between a first end and a second end defining an outer surface and an inner surface. The elongate bar has a length, diameter and a plurality of bends to accommodate the stabilizer bar within an undercarriage of a vehicle. The elongate hollow body comprises a steel alloy comprising carbon, manganese, silicon and aluminum, and has an ultimate tensile strength of about 1400 MPa or greater, a yield strength to ultimate tensile strength ratio of between about 0.65 and 0.90, and an elongation of about 12% or greater.

BRIEF DESCRIPTION OF THE DRAWINGS

Other features and advantages of the invention will be apparent from the following description taken in connection with the accompanying drawings, wherein:

FIG. 1A is a top down view of one embodiment of an automobile stabilizer bar;

FIG. 1B is a perspective view of an automobile stabilizer bar attached to a vehicle suspension;

FIG. 2 is a perspective view of a cross-section of a metal tubular bar;

DETAILED DESCRIPTION OF THE PREFERRED EMBODIMENTS

Figure 3:
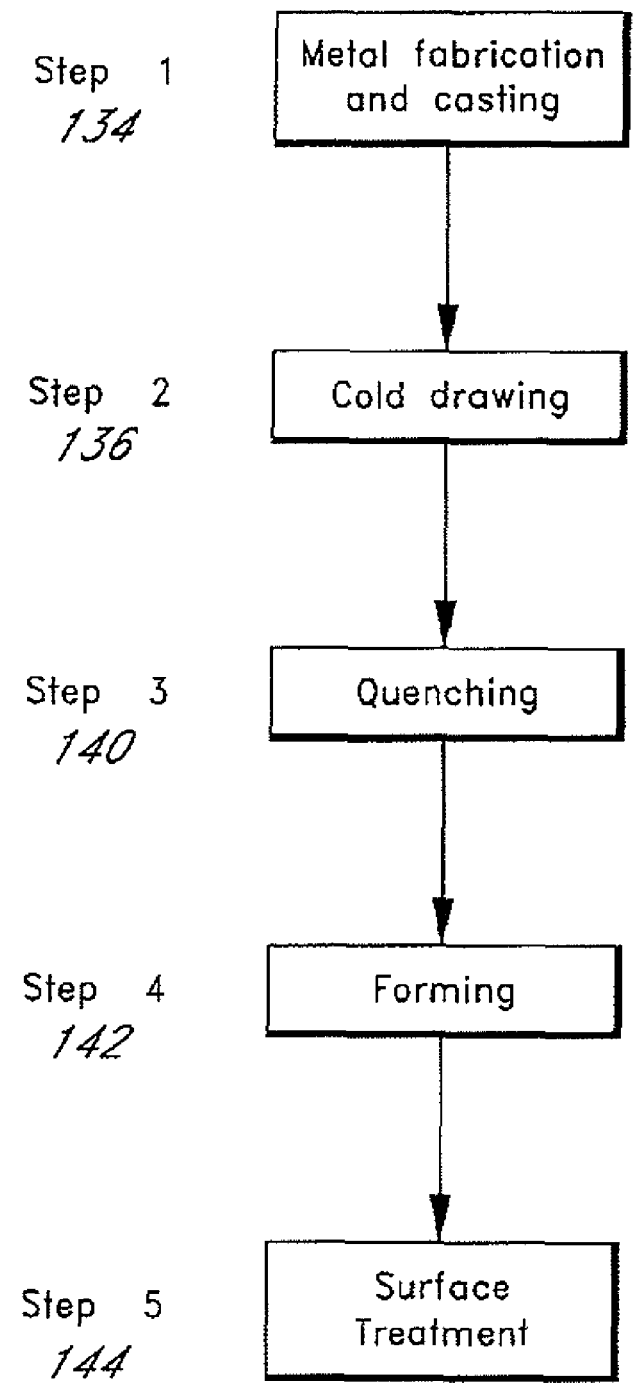
FIG. 3 is a flowchart showing a manufacturing process to produce a seamless steel tubular bar having ultra high strength with improved cold formability.

Embodiments of the present invention relate to the manufacture of stabilizer bars, especially for motor vehicles. However, the embodiments of the invention may be applied to the manufacture of any suitable tubular bar where high strength and formability are needed to obtain the final shape of the bar. Examples include, but are not limited to, structural frames and pipes for transmission of gas, liquids, and finely divided solids.

The term "bar" as used herein is a broad term and includes its ordinary dictionary meaning and also refers to a generally hollow, elongate member which may be straight or may have bends or curves and be formed to a predetermined shape, and any additional forming required to secure the formed tubular bar in its intended location. The bar may be tubular, having a substantially circular outer surface and inner surface, although other shapes and cross-sections are contemplated as well. As used herein, the term "tubular" refers to any elongate, hollow shape, which need not be circular or cylindrical.

A bar formed through embodiments of the methods described in detail below possesses strength and formability suitable for applications such as automobile stabilizer bars. Advantageously, however, the method of fabricating the bar avoids heat treatment subsequent to a quenching operation, while maintaining the strength of the bar, which significantly reduces the fabrication cost.

FIG. 1A illustrates one embodiment of an automobile stabilizer bar 100 formed from a tubular bar 114 (shown in FIG. 2). Generally, the stabilizer bar 100 is designed for attachment to the suspension system of an automobile so as to span the width of the automobile between the tires, and act to counteract roll during a turn. FIG. 1B illustrates a stabilizer bar 100 attached to the suspension mechanisms 108 of a vehicle (not shown), such as by using rubber bushes or the like. The stabilizer bar 100 as illustrated in FIG. 1A includes a stabilizer bar central body 102, stabilizer bar arms 104, and a plurality of bends. For example, one embodiment of a stabilizer bar 100 as shown in FIG. 1A includes first stabilizer bar central body bends 120a, second stabilizer bar central body bends 120b, and stabilizer bar arm bends 122.

More particularly, the stabilizer bar 100 of FIG. 1A extends between a first end 106a and a second end 106b, and possesses a generally elongate stabilizer central body 102 with a plurality of stabilizer arms 104 at each of the ends. The stabilizer bar 100 is preferably tubular, and includes a stabilizer bar outer surface 112a and a stabilizer bar inner surface 112b, which, as illustrated in FIG. 2, are generally concentric, separated by a predetermined wall thickness 116. Along the length of the central body 102, a plurality of predetermined central body bends 120a and 120b are present, allowing the stabilizer bar 100 to be accommodated within the undercarriage of the automobile. Additionally, predetermined stabilizer arm bends 122 are present at the first and second end portions 110a and 110b of the stabilizer central body 102 so as to define the stabilizer arms 104. The stabilizer arms 104 extend at a generally 90 degree angle away from the central body 102, and may or may not have additional bends (not shown) as desired for the particular application.

tions of this design may be made by those skilled in the art without departing from the scope of the present teachings. Other stabilizers are described in U.S. Pat. Nos. 4,231,555, 6,196,530, 6,384,388, and 6,682,610, the entirety of each of which is incorporated herein by reference. The stabilizer bar 100 as illustrated in FIG. 1A has six bends, but it will be appreciated that a fewer or greater number of bends may be provided, e.g., 4 or more, 6 or more, 8 or more, or even 10 or more bends, in order to avoid interference with the parts of the vehicle and its suspension system, and to provide desired performance properties. The stabilizer bar 100 may be mounted to a vehicle such as with rubber bushes (shown in FIG. 1B) connected to the central body 102 and with stabilizer links (not shown) connected to the stabilizer bar arms 104, and by other mechanisms known to one of skill in the art.

In one embodiment, the stabilizer bar 100 may comprise a metallic tubular bar 130. In one aspect of this implementation, the form of the metallic tubular bar 130 is seamless. In an alternative implementation, the metallic tubular bar 130 may contain one or more seams. In a further embodiment, the metallic tubular bar is made of a steel alloy, and may have the compositions illustrated below in TABLE 1, in mass percent.

TABLE I

| Element (%) | Composition Range | | | | | |
|---|---|---|---|---|---|---|
| | General | | More Preferred | | Most preferred | |
| | Minimum | Maximum | Minimum | Maximum | Minimum | Maximum |
| C | 0.13 | 0.35 | 0.15 | 0.28 | 0.16 | 0.21 |
| Mn | 0.80 | 2.00 | 1.20 | 1.80 | 1.40 | 1.70 |
| S | 0 | 0.05 | 0 | 0.04 | 0 | 0.03 |
| P | 0 | 0.045 | 0 | 0.04 | 0 | 0.03 |
| Si | 0.10 | 0.7 | 0.20 | 0.70 | 0.20 | 0.70 |
| Ni | 0 | 0.50 | 0 | 0.50 | 0 | 0.30 |
| Cr | 0 | 0.50 | 0.15 | 0.50 | 0.15 | 0.30 |
| Mo | 0 | 0.25 | 0 | 0.25 | 0.05 | 0.15 |
| V | 0 | 0.30 | 0 | 0.30 | 0.07 | 0.20 |
| Cu | 0 | 0.35 | 0 | 0.35 | 0 | 0.20 |
| Al | 0.01 | 0.07 | 0.01 | 0.07 | 0.015 | 0.05 |
| Nb | 0 | 0.05 | 0 | 0.05 | 0 | 0.03 |

The stabilizer bar 100 is preferably dimensioned so as to substantially span the width of the automobile and attach to the vehicle suspension, such as shown in FIG. 1B. In one embodiment, the stabilizer bar central body 102 preferably extends along an axis 124 parallel to the width of the vehicle, having a length 126 of about 500 to 1500 mm, preferably about 1100 mm. As illustrated in FIG. 1A, the stabilizer bar arm bends 122 turn at about a 90 degree angle. The stabilizer arms 104 may be generally straight as illustrated, or may have curvature, and are preferably integrally formed with the central body 102, having a length of about 100 to 500 mm, preferably about 200 mm. The stabilizer arms 104 need not have the same length each, and thus, it will be appreciated that one of the stabilizer arms 104 may be longer than the other.

In one embodiment, as illustrated in FIGS. 1A and 2, the stabilizer bar possesses an outer diameter in the range of about 15 to 70 mm, with a wall thickness 116 (the distance between the outer surface 112a and inner surface 112b of the tubular bar 114) to outer diameter ratio between about 0.15 to 0.25. For example, the wall thickness 116 may be between about and 2 and 18 mm. In one preferred embodiment, the stabilizer bar 100 has an outer diameter of about 28 mm, an inner diameter of about 20 mm, and a wall thickness of about 4 mm.

It will be appreciated that the stabilizer bar 100 illustrated here is simply one embodiment and that a number of varia- As illustrated in Table I, the metallic tubular bar 130 preferably comprises a steel alloy comprising not only carbon (C) but also manganese (Mn), silicon (Si) and aluminum (Al), and even more preferably includes chromium (Cr), molybdenum (Mo), and vanadium (V). Nickel (Ni) and niobium (Nb) may optionally be added as well. Impurities of sulfur (S), phosphorous (P) and copper (Cu) may be present, however, the concentration of these impurities in one embodiment is preferably reduced to an amount as low as possible.

C is an element whose addition inexpensively raises the strength of the steel. If the C content is less than about 0.13%, it may be in some embodiments difficult to obtain the strength desired in the tubular stabilizer bar 100. On the other hand, if the steel has a C content greater than about 0.35%, in some embodiments, cold formability decreases. Therefore, the general C content range is preferably about 0.13% to 0.35%. A preferred range for the C content is about 0.15% to 0.28% and an even more preferred range is about 0.16 to 0.21%.

Mn is an element whose addition is effective in increasing the hardenability of the steel, increasing the strength and toughness of the steel. If the Mn content is less than about 0.8% it may be difficult in some embodiments to obtain the desired strength in the steel. However, if the Mn content exceeds about 2.0%, in some embodiments banding structures become marked, and toughness decreases. Accordingly, the general Mn content range is about 0.8% to 2.0%. However, a preferred Mn range is about 1.20% to 1.80% and a more preferred range is about 1.40% to 1.70%.

Si is an element whose addition has a deoxidizing effect during steel making process and also raises the strength of the steel. If the Si content is less than about 0.10%, the steel in some embodiments may be susceptible to oxidation, with a high level of micro-inclusions. On the other hand, though, if the Si content of the steel exceeds about 0.70%, in some embodiments both toughness and formability of the steel decrease. Therefore, the general Si content range is about 0.1% to 0.70%. A preferred Si range is about 0.20% to 0.70% and a more preferred range is about 0.30-0.60%.

S is an element that causes the toughness and workability of the steel to decrease. Accordingly, the general S content of the steel in some embodiments is limited to a maximum of about 0.050%. A preferred maximum value is 0.040% and a more preferred maximum value is 0.030%.

Ni is an element whose addition increases the strength and toughness of the steel. However, Ni is very costly and therefore the Ni addition is limited in some embodiments to about 0.50% maximum. A more preferred maximum value is about 0.30%.

Cr is an element whose addition which is effective in increasing the strength of the steel. If the Cr content is less than about 0.15%, in some embodiments it may be difficult to obtain the desired strength. A preferred Cr content is about 0-0.5%. A more preferred Cr content is about 0.15% to 0.50%. And an even more preferred Cr content is about 0.15% to 0.30%.

Mo is an element whose addition is effective in increasing the strength of the steel and further assists in retarding softening during tempering. However, this ferroalloy is expensive, making it desirable to reduce the maximum content. Therefore, a preferred Mo range is about 0 to 0.25% maximum and a more preferred range is about 0.05% to 0.15%.

V is an element whose addition is effective in increasing the strength of the steel, even if added in small amounts, and also assists in retarding softening during tempering. However, this ferroalloy is expensive, making it desirable to reduce the maximum content. Therefore, a preferred V range is about 0 to 0.30% maximum and a more preferred range is about 0.07% to 0.20%.

Al is an element whose addition to the steel during the steel making process reduces the inclusion content and refines the steel grain. A preferred Al content is about 0.010% to 0.070% and a more preferred range is about 0.02 to 0.05%.

One embodiment of a method 132 of producing a high strength, high formability metallic tubular bar 130 without heat treatment after quenching, and a stabilizer bar 100 made from the same, will now be described with reference to FIG. 3. In one embodiment, the method 132 comprises a first step 134 in which metal is fabricated and cast into a metallic tube, a second step 136 wherein the metallic tubular bar 130 is cold drawn, a third step 140 where the metallic tubular bar 130 is heated and quenched, a fourth step 142 wherein bends such as 120a, 120b, and 122 are introduced into the metallic tubular bar 130, and a fifth step 144 wherein a surface treatment is applied to the metallic tubular bar 130.

The first step 134 of the method 132 preferably comprises fabrication of the metal and production of a solid metal bar capable of being pierced and rolled to form a seamless metal tube. In one embodiment, the metal may comprise steel. One of the main objectives of the steelmaking process is to refine the iron by removal of carbon, silicon, sulfur, phosphorous, and manganese. In particular, sulfur and phosphorous are prejudicial for steel because they degrade the mechanical properties of the steel. In one embodiment, ladle metallurgy is used before or after basic processing to perform specific purification steps that allow faster processing in the basic steel making operation.

In one embodiment of the steelmaking process, the steel is fabricated under clean practice in order to obtain a steel possessing low sulfur and phosphorous concentrations. Clean practice in secondary metallurgy is performed by bubbling inert gases in the ladle furnace to force inclusions and impurities to float. This technique produces a fluid slag capable of absorbing impurities and inclusions. With the addition of SiCa to the liquid steel, the fluid slag is further capable of modifying the size and shape of inclusions. In this manner, a high quality steel with a low inclusion content results. Following the production of the fluid slag, the steel is cast into a round solid billet having a uniform diameter along the steel axis.

The billet thus fabricated is subsequently formed into a tubular bar, in one embodiment. A solid, cylindrical billet of clean steel may be heated to a temperature of about 1200° C. to 1300° C., preferably about 1250° C., and is subject to a rolling mill. Within the rolling mill, the billet is pierced, in certain preferred embodiments utilizing the Manessmann process, and hot rolling is used to substantially reduce the outside diameter and wall thickness, while the length is substantially increased. In a non-limiting example, a solid bar possessing an outer diameter of about 148 mm may be hot rolled into a tube possessing an outer diameter of about 38 mm and a wall thickness of about 5.5 mm.

The cross-sectional area reduction experienced by the tube, measured as the ratio of the cross-sectional area of the solid billet to the cross-sectional area of the hot rolled tube, is desirable in order to obtain a refined microstructure. A refined microstructure advantageously allows obtaining desired mechanical properties within the fabricated tube. Therefore, in one embodiment, the minimum cross-section area reduction is about 15:1. In a preferred embodiment, the minimum cross-sectional area reduction is about 20:1. The seamless hot rolled tube of clean steel so manufactured is then cooled to room temperature. Advantageously, the seamless hot rolled tube of clean steel possesses an approximately uniform wall thickness, both circumferentially around the tube and longitudinally along the tube axis.

The hot rolled tube is then passed through different finishing steps. Non-limiting examples of these finishing steps include cutting the tube to length, such as into 2 to 4 pieces, and cropping the ends of the tube, straightening the tube using rotary straightening equipment, if necessary, and non-destructive testing by a plurality of different techniques, such as electromagnetic testing or ultrasound testing.

In this fashion, a straight-sided, metallic tubular bar 130 having a composition within the ranges illustrated in Table I may be provided. It will be appreciated that although the ranges in Table I are preferred, other compositions may also be suitable if they provide one or more of the desired properties discussed below.

The second step 136 of the method 132 comprises cold drawing of the metallic tubular bar 130. Cold drawing is a method of further reducing the cross-sectional dimensions of the tubular bar 130 and is performed at approximately room temperature. In preparation for cold drawing, the surface of each piece of hot rolled tube is first conditioned. In one embodiment of the method 132, this conditioning includes pickling the tubular bar 130 by immersion in an acid solution and applying an appropriate layer of lubricants. The lubricants may include, but are not limited to, a combination of zinc phosphate and sodium esthearate or reactive oil.

After surface conditioning, the tubular bar 130 is subjected to one or more cold drawing operations. Cold drawing is accomplished by pulling the tubular bar 130 through an external die that has a diameter smaller than the outside diameter of tubular bar. In certain embodiments, the internal surface of the tubular bar 130 is also supported by an internal mandrel anchored to one end of a rod, so that the mandrel remains close to the die during drawing. In a non-limiting example, the cross-sectional area of the metallic tubular bar 130 at the conclusion of a first cold drawing operation may be approximately 22-26% of the original value. A subsequent second cold drawing operation further reduces the cross-sectional area of the metallic tubular bar 130 by approximately 25-30% of the cross-sectional area at the conclusion of the first cold drawing operation.

The tubular bar 130 is so cold drawn at least once, with each pass reducing both the outside diameter and the wall thickness of the tubular bar 130. The cold drawn metallic tubular bar 130 so manufactured has a uniform outside diameter along the tube axis and a uniform wall thickness both circumferentially around the tube and longitudinally along the tube axis. The cold drawn metallic tubular bar 130 further has an outside diameter of preferably between about 15 and 70 mm and a wall thickness to outside diameter ratio preferably from about 0.15 to 0.25.

Figure 4:
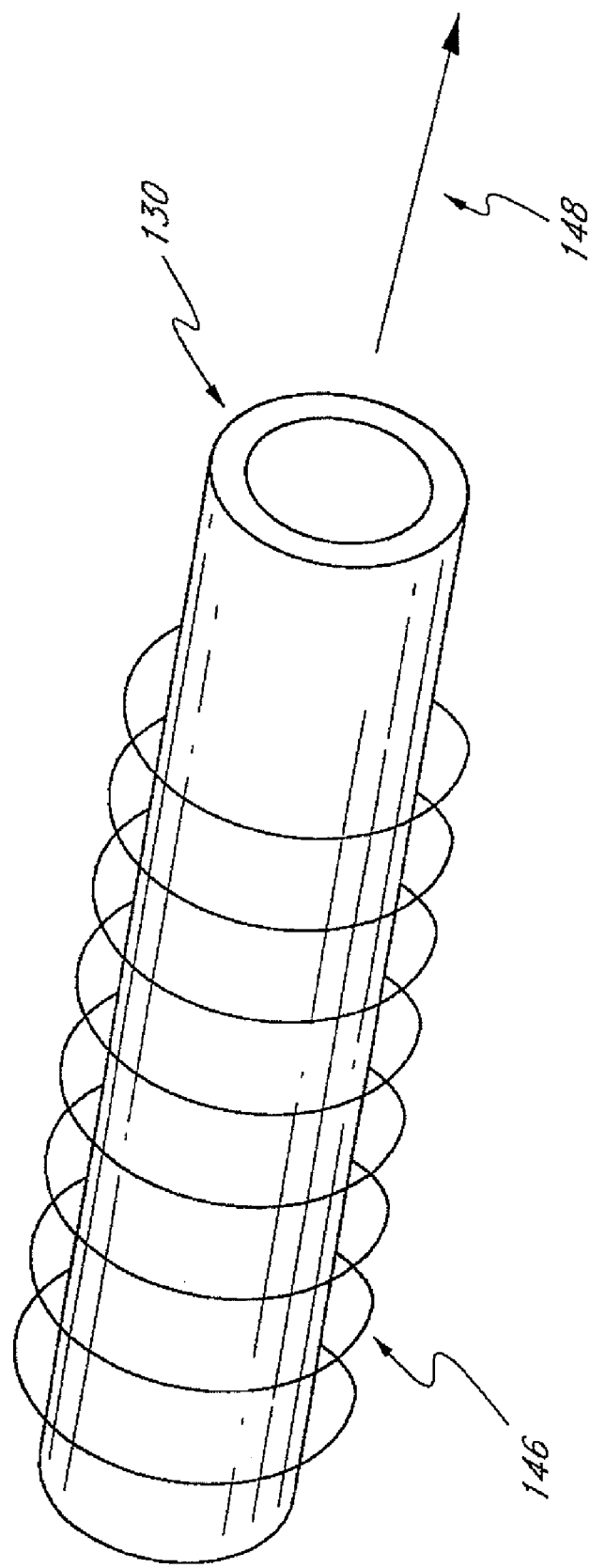
FIG. 4 illustrates one embodiment of a heating procedure for metal tubular bars.
Figure 5:
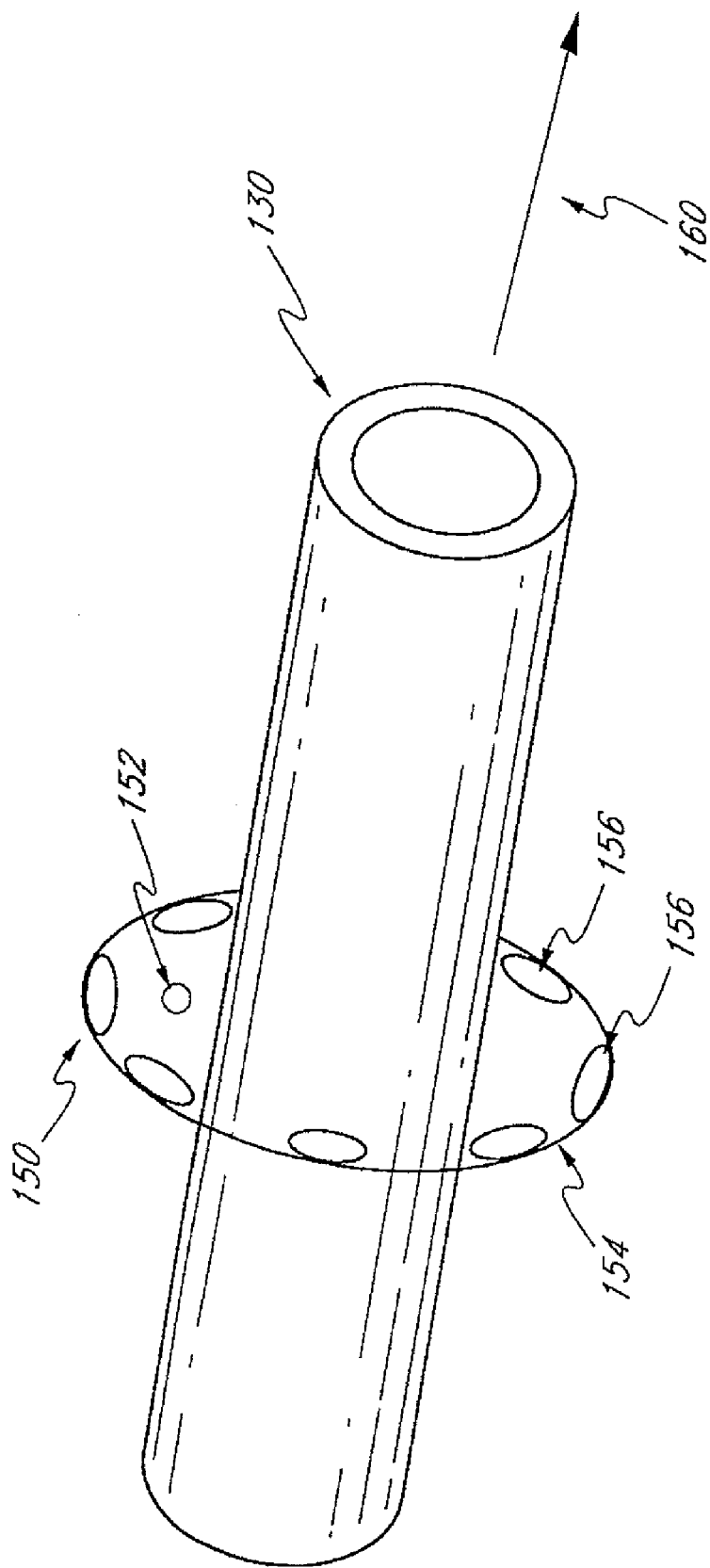
FIG. 5 illustrates one embodiment of a quenching procedure for metal tubular bars.

The third step 140 in the method 132 hardens the metallic tubular bar 130 by quick heating and cooling. FIGS. 4 and 5 present one embodiment of this process. The metallic tubular bar 130 is passed through a heating device 146 along a heating feed direction 148, rapidly heating the metallic tubular bar 130 to a predetermined temperature. After a predetermined hold period in which the temperature of the metallic tubular bar 130 is kept approximately constant, a quenching member 150 directs a quenching fluid 152 onto the metallic tubular bar 130, cooling the metallic tubular bar 130 from the austenitization temperature to a post-quenching temperature at a predetermined rate. In one embodiment, the quenching fluid 152 is directed onto the outer surface 112a of the metallic tubular bar 130. In an alternative embodiment, the quenching fluid 152 is directed onto both the outer surface 112a and the inner surface 112b of the metallic tubular bar 130.

FIG. 5 demonstrates one embodiment of the heating process. The tubular bar 130 moves through the heating device 146, which in a preferred embodiment, comprises an induction heater. The induction heater desirably may produce a higher surface quality with fewer surface irregularities, thereby reducing the formation of cracks during fatigue which may ultimately lead to failure. In this process, the metallic tubular bar 130 is heated to a temperature preferably not less than about 900° C. at a rate of about 180 to 550° C./sec by the heating device 146. In one embodiment, the tubular bar 130 is heated to a temperature between about 900 to 1100° C. In alternative embodiments, this temperature is between about 920 and 1000° C. Depending on the size of the tube, the rate of motion of the tubular bar 130 may range from approximately 5 to 25 m/min during the heating process.

Once the temperature of the metallic tubular bar 130 reaches the predetermined temperature, the temperature of the metallic tubular bar 130 is subsequently held approximately constant for a minimum time in order to assure homogeneity. This time is preferably not more than about 40 seconds to avoid high oxidation. In alternative embodiments, the metallic tubular bar 130 is held at the elevated temperature for about 1 to 10 seconds.

One embodiment of the quenching procedure is illustrated in FIG. 5. The quenching member 150 comprises a quencher head 154 possessing a plurality of quencher head nozzles 156. The nozzles 156 are aligned radially about the outer surface 112a of the metallic tubular bar 130 and release water at a temperature between about 25 to 40° C. at a rate of about 30 to 60 m³/hr. Moving the metallic tubular bar 130 along a quench feed direction 160 at rate of about 7-12 m/min through the quencher head 154, the metallic tubular bar 130 is cooled at a rate of approximately 180 to 600° C./sec to a temperature preferably not greater than about 80° C. Optionally, the inner surface 112b of the metallic tubular bar 130 may also be simultaneously quenched by flowing water through the inner surface 112b of the metallic tubular bar 130.

In one embodiment, after the quenching operation, a metallic tubular bar 130 comprising the composition of Table II has the following mechanical properties: approximately 1533 MPa ultimate tensile strength (UTS), approximately 989 MPa yield strength, and about 15% elongation at failure. In one embodiment, the above properties are measured using the method described in ASTM A370, "Standard Test Methods and Definitions for Mechanical Testing of Steel Products", the entirety of which is incorporated herein by reference.

TABLE II

| Element | Composition (%) |
|---------|-----------------|
| C       | 0.18            |
| Mn      | 1.51            |
| S       | 0.002           |
| P       | 0.012           |
| Si      | 0.37            |
| Ni      | 0.02            |
| Cr      | 0.2             |
| Mo      | 0.08            |
| V       | 0.13            |
| Cu      | 0.07            |
| Al      | 0.03            |
| Nb      | 0.01            |

Another sample tested yielded a bar having an UTS of about 1500 MPa, yield strength of about 1090 MPa, and an elongation of about 20%.

More preferably, the composition ranges of Table I and the manufacturing process described above can be selected to produce a metallic tubular bar possessing a UTS in the range of about 1400 MPa or more, more preferably about 1400 MPa to 1700 MPa, a YS in the range of about 930 MPa to 1300 MPa, and elongation of not less than about 12%. These composition ranges have been found to produce metallic tubular bars 130 with excellent cold formability, as described below. In one embodiment, the parameters can be selected to produce a metallic tubular bar 130 possessing YS/UTS ratio in the range of about 0.65 to 0.90, more preferably about 0.65 to 0.85. The applicants have found in particular that that in one embodiment, a metallic tubular bar 130 having an ultimate tensile strength of about 1400 MPa or more, a YS/UTS ratio of between about 0.65 and 0.80 and an elongation of about 15% or greater provides the ability for the metallic tubular bar 130 to be cold-formed, as described below. Advantageously, no further heat treatment, such as tempering or annealing, is utilized in the manufacturing process following the quench, reducing the cost of production.

Following the quench, the metallic tubular bar 130 is subjected to one or more forming operations in the fourth step 142 of the method 132 to create a formed tube. Desirably, because of the composition of the metallic alloy and the quenching process, the metallic tubular bar 130 possesses sufficient mechanical properties so that it can be formed as-quenched, without damage, or the need for any subsequent elevated temperature processing. In other words, the as-quenched metallic tubular bar 130 provides excellent cold formability, which can achieve even approximately 90° bends without cracks or collapsing effects, as determined by visual inspection. In alternative embodiments, the metallic tubular bars formed are capable of bending at least 10°, more preferably at least 20°, 30°, 40° or 50°, without cracks or collapsing effects.

Preferably, the forming occurs at about room temperature. The inventors have discovered that if forming occurs at temperatures above approximately 100-150° C., degradation in the mechanical properties of the formed metallic tubular bars may occur. In one embodiment, forming takes place below about 80° C., more preferably at about room temperature, from about 5° C. to about 40° C. In one embodiment, these forming operations comprise manipulating the form of the metallic tubular bar 130 into a predetermined shape approximately equal to that desired when the formed metallic tubular bar 130 is in use. In one embodiment of the method 132, the formed metallic tubular bar 130 is a stabilizer bar 100 such as shown in FIGS. 1A and 1B above. In this implementation, the metallic tubular bar 130 is cut to a predetermined length and subsequently subjected to a plurality of bending operations understood to those knowledgeable in the art.

In one implementation of the method 132, the bending operations may be carried out on a CNC bending machine. The metallic tubular bar 130 is bent sequentially, such that each bend is formed one at a time. The metallic tubular bar 130 may be clamped at one end by a mandrel that is capable of controlled rotation and allows for bending in different planes. The mandrel may move horizontally on a rack and allow for pushing of the tube during bending. The application of a compressive force by pushing during bending reduces the thinning effect on the final product. The operation may also take into account the spring-back of the metallic tubular bar 130 during bending, such that metallic tubular bar 130 may be over-bent to obtain the final desired shape.

In one optional embodiment, the formed tubular bar 130 is inspected after the forming process to determine the extent of damage, if any, which has occurred in the forming process. In brief, damage and/or failure are detected by visual inspection formed tubular bar 130. A tubular bar 130 which fractures during forming is considered to have failed. In the event that complete fracture does not take place, the number and size of cracks or other surface irregularities on the convex surface of the tubular bar 130 visible to the unaided eye are determined. The number and/or size of the cracks which constitute a failed tubular bar 130 are predetermined according to the intended application, and a tubular bar 130 possessing less than the predetermined number and size of cracks or other surface irregularities on the convex surface is considered to pass inspection Following the bending operations, the first and second ends 106a and 106b of the stabilizer bar 100 are further formed to a shape which allows attachment of stabilizer bar 100 to the suspension of an automobile. For example, holes may be drilled in the first and second ends 106a and 106b of the stabilizer bar 100.

The fifth step 144 of the method 132 comprises surface treatment of the formed metallic tubular bar 130 in order to induce compressive stresses, such as upon the outer surface 112a, which inhibit the formation of cracks on the outer surface 112a of the metallic tubular bar 130 under fatigue loadings. In one embodiment, the outer surface 112a of the metallic tubular bar 130 is subjected to such treatment. In an alternative embodiment, both the outer and inner surfaces 112a and 112b of the metallic tubular bar 130 are subjected to surface treatment. Depending on the performance requirements of the formed metallic tubular bar 130, this step may be omitted.

In one embodiment of the method 132, the formed metallic tubular bar 130 is a stabilizer bar 100 and steel pellets with a hardness of approximately 55 to 62 HRC are propelled at the outer surface 112a and/or inner surface 112b of the metallic tubular bar 130 with an ALMEN intensity of approximately 16 A-18 A until a coverage of about 95% is achieved. In a further alternative embodiment, autofrettaging may be used to induce a state of residual compressive stress on the inner surface 112b of the metallic tubular bar 130.

Figure 6:
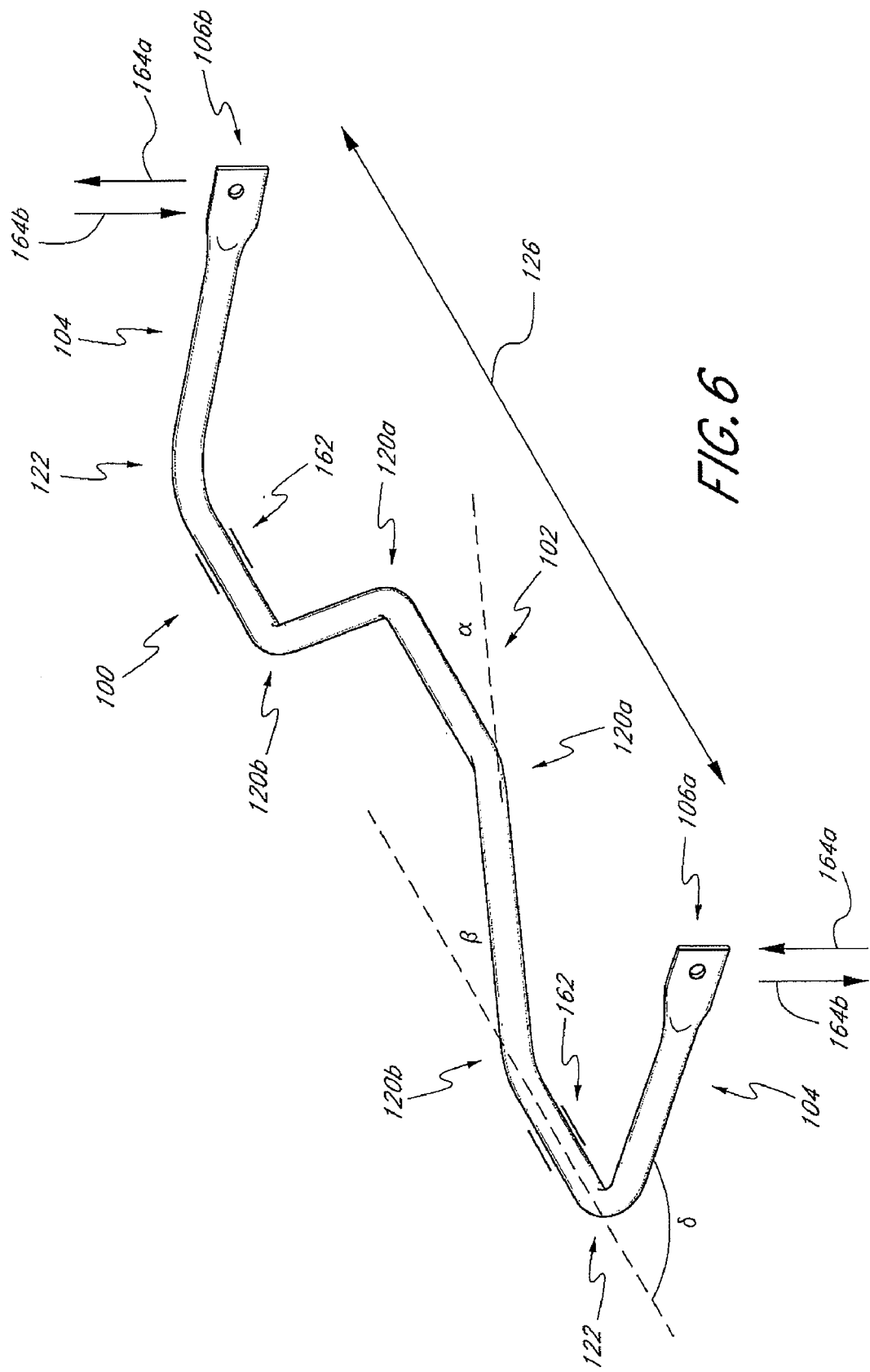
FIG. 6 illustrates a perspective view of one embodiment of a stabilizer bar constrained and loaded in laboratory testing in order to simulate fatigue loading experienced in service.
Figure 7:
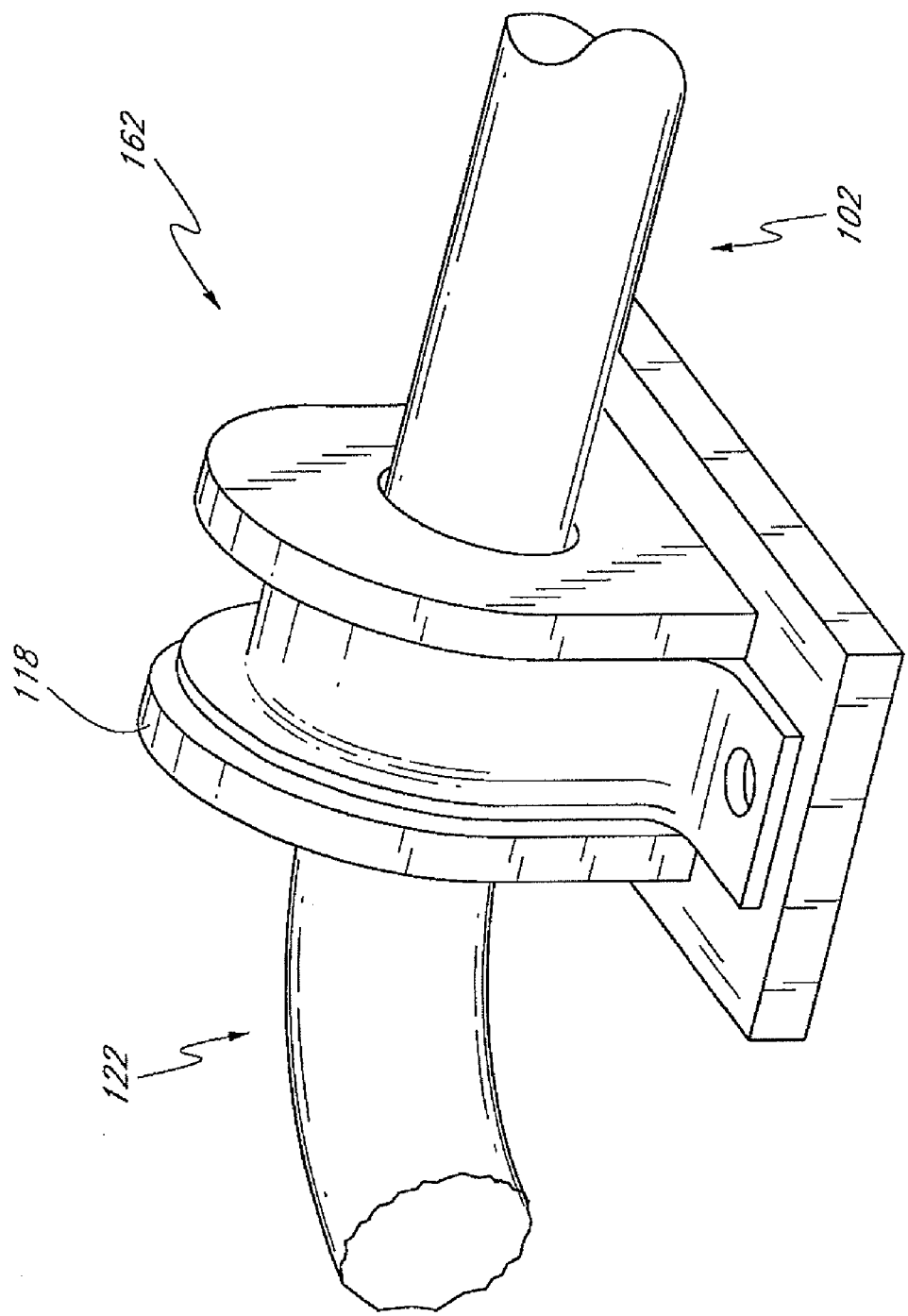
FIG. 7 illustrates a perspective view of one embodiment of a bushing used to constrain the stabilizer bar of FIG. 6.

In one embodiment, the performance of stabilizer bars 100 fabricated according to the method 132 were evaluated through laboratory testing. These tests were designed to simulate the mode of loading experienced by tubular stabilizer bars 100 in service and to measure the fatigue life of tubular bars 130 formed into tubular stabilizer bars 100. As illustrated in FIG. 6, the tubular stabilizer bars 100 were tested by constraining the stabilizer bar at a plurality of predetermined positions 162 along the stabilizer bar central body 102, interconnecting the stabilizer arms 104 to actuating hydraulic cylinders at approximately the ends 106a and 106b of the stabilizer bar 100, and imposing a displacement upon stabilizer bar arms 104 with the testing machine. In one preferred embodiment, the stabilizer bar 100 is constrained by two bushings, illustrated in FIG. 7, 118, each positioned along the stabilizer bar central body 102 approximately equidistant between the bends 120b and 122. The stabilizer bar arms 104 are reversibly displaced by about 180 degrees out of phase with respect to each other about their rest position. That is to say, when one arm 104 was displaced in an upwards direction 164a, the other arm 104 was moving in a downwards direction 164b by an approximately equal amount, and vice versa. This displacement was imposed as a function of time according to a sine profile having a frequency of about 0.5 Hz and a maximum amplitude of about ±32 mm. In this manner, a load of about 2100N was simulated. In this way bends are subjected to a Von Mises stress above about 450 MPa.

Stabilizer bars 100 having approximately the composition described in Table II were so tested. These tested stabilizer bars 100 possessed an outer diameter of approximately 28 mm, a wall thickness 116 of approximately 4.2 mm, and a length 126 of approximately 1100 mm. As further illustrated in FIG. 6, the stabilizer bars 100 included central body bends 120a and 120b which form angles α and β of approximately 45 degrees with respect to the axis 124 and stabilizer bar arm bends 122 which form angles δ of approximately 85 degrees with respect to the axis 124. In non-limiting examples, stabilizer bars 100 formed according to embodiments of the method 132 were found to have a fatigue life of about 300,000 cycles or greater when the region about at least one of the bends is subjected to stresses above about 450 MPa. More preferably, the fatigue life is about 400,000 cycles or greater when the region about at least one of the bends is subjected to stresses above about 450 MPa. It will be appreciated that the fatigue life of the stabilizer bar may vary depending on the desired application, method of manufacture and composition of the stabilizer bar.

As described in the embodiments above, the applicants have found that certain material compositions, such as described in Table I, in combination with the methods disclosed, provide the ability to form bars possessing excellent cold formability, such that the bar is capable of being formed or bent into a desired shape, and can subsequently be utilized in its desired application without any subsequent thermal processing. For example, steel bars having cold formability may comprise about 0.13 to 0.35% carbon, about 0.8 to 2.0% manganese, about 0.10% to 0.70% silicon, and about 0.01% to 0.07% aluminum. More preferably, the steel bar further comprises up to about 0.50% chromium, up to about 0.25% molybdenum, and up to about 0.30% vanadium.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A tubular bar, comprising:
    an elongate hollow body extending between a first end and a second end defining an outer surface and an inner surface;
    wherein the elongate hollow body comprises a steel alloy consisting essentially of:
    about 0.13 to 0.35% carbon;
    about 0.8 to 2.0% manganese;
    about 0.10% to 0.70% silicon;
    about 0.01% to 0.07% aluminum;
    up to about 0.50% nickel;
    up to about 0.50% chromium;
    up to about 0.25% molybdenum;
    up to about 0.05% niobium, and
    up to about 0.30% vanadium;
    wherein the elongate hollow body as quenched without subsequent heat treatment has a fatigue life of greater than about 300,000 cycles as measured under laboratory testing when the region about at least one bend formed in the elongate hollow body is subjected to cyclic stresses above about 450 MPa.

2. The tubular bar of claim 1, further consisting essentially of:
    about 0.15 to 0.28% carbon;
    about 1.2 to 1.8% manganese;
    about 0.20 to 0.70% silicon; and
    about 0.15 to 0.50% chromium.

3. The tubular bar of claim 1, further consisting essentially of:
    about 0.16 to 0.21% carbon;
    about 1.4 to 1.7% manganese;
    about 0.2 to 0.7% silicon;
    up to about 0.30% nickel:,
    about 0.015 to 0.05% aluminum;
    about 0.15% to 0.3% chromium;
    about 0.05% to 0.15% molybdenum;
    up to about 0.03% niobium: and
    about 0.07% to 0.20% vanadium.

4. The tubular bar of claim 1, wherein the tubular bar is a stabilizer bar configured for use on a vehicle.

5. The tubular bar of claim 4, wherein the stabilizer bar comprises a plurality of bends shaped to accommodate the stabilizer bar within an undercarriage of the vehicle.

6. The tubular bar of claim 5, in combination with a vehicle, wherein the tubular bar is attached to the undercarriage of the vehicle.

7. A tubular bar suitable for cold forming, comprising:
    an elongate hollow body extending between a first end and a second end defining an outer surface and an inner surface:
    wherein the elongate hollow body as quenched without subsequent heat treatment comprises a steel alloy having an ultimate tensile strength of about 1400 MPa or greater, a yield strength to ultimate strength ratio of between about 0.65 and 0.90, an elongation of about 12% or greater, and a fatigue life of greater than about 300,000 cycles as measured under laboratory testing when the region about at least one bend formed in the bar is subjected to cyclic stresses above about 450 MPa;
    wherein the body comprises about 0.13-0.35% carbon, about 0.8-2.0% manganese, about 0.1-0.7% silicon, about 0.01-0.07% aluminum, up to about 0.50% nickel, about 0-0.5% chromium, about 0-0.25% molybdenum, up to about 0.05% niobium; and about 0-0.3% vanadium.

8. The tubular bar of claim 7, wherein the body comprises about 0.16% to 0.21% carbon.

9. The tubular bar of claim 7, wherein the body comprises carbon, manganese, silicon, aluminum and at least one selected from the group consisting of:
    nickel, chromium, molybdenum, niobium and vanadium.

10. The tubular bar of claim 7, wherein the tubular bar as quenched without subsequent heat treatment has a fatigue life greater than about 400,000 cycles as measured under laboratory testing, when the region about at least one bend formed in the bar is subjected to cyclic stresses above about 450 MPa.

11. A vehicular stabilizer bar, comprising:
    an elongate hollow body extending between a first end and a second end defining an outer surface and an inner surface, the elongate hollow body having a length, diameter and a plurality of bends to accommodate the stabilizer bar within an undercarriage of a vehicle;
    wherein the elongate hollow body comprises a steel alloy consisting essentially of:
    about 0.13 to 0.35% carbon;
    about 0.8 to 2.0% manganese;
    about 0.10 to 0.70% silicon;
    about 0.01 to 0.07% aluminum;
    up to about 0.50% nickel;
    up to about 0.50% chromium;
    up to about 0.25% molybdenum;
    up to about 0.05% niobium; and
    up to about 0.30% vanadium;
    wherein the elongate hollow body as quenched without subsequent heat treatment has an ultimate tensile strength of about 1400 MPa or greater, a yield strength to ultimate tensile strength ratio of between about 0.65 and 0.90, an elongation of about 12% or greater, and includes bends formed with an angle at least 10° without cracks or collapsing effects.

12. The vehicular stabilizer bar of claim 11, wherein bends are capable of being formed in the elongate hollow body as quenched without subsequent heat treatment to an angle of about 90° without cracks or collapsing effects.

13. The vehicular stabilizer bar of claim 11, wherein the elongate hollow body as quenched without subsequent heat treatment has a fatigue life of greater than about 300,000 cycles as measured under laboratory testing when the region about at least one of the bends is subjected to cyclic stresses above about 450 MPa.

* * * * *

UNITED STATES PATENT AND TRADEMARK OFFICE
CERTIFICATE OF CORRECTION

PATENT NO. : 8,007,601 B2  Page 1 of 1
APPLICATION NO. : 12/825231
DATED : August 30, 2011
INVENTOR(S) : Edgardo Oscar López et al.

It is certified that error appears in the above-identified patent and that said Letters Patent is hereby corrected as shown below:

At Column 1, Line 36, after "diameter", please insert --.--.

At Column 8, Line 23, please delete "Manessmann" and insert therefore, --Mannesmann--.

At Column 11, Line 53, after "inspection", please insert --.--.

At Column 13, Line 34, in Claim 1, please delete "niobium," and insert therefore, --niobium;--.

At Column 13, Line 52, in Claim 3, please delete "nickel:," and insert therefore, --nickel;--.

At Column 13, Line 57, In Claim 3, please delete "niobium:" and insert therefore, --niobium;--.

At Column 14, Line 8, in Claim 7, after "ultimate", please insert --tensile--.

Signed and Sealed this
Eleventh Day of September, 2012

David J. Kappos
*Director of the United States Patent and Trademark Office*